(12) United States Patent
Kern

(10) Patent No.: US 9,527,140 B2
(45) Date of Patent: Dec. 27, 2016

(54) DRILLING APPARATUS

(75) Inventor: Robert L. Kern, Ashland, OH (US)

(73) Assignee: Minnich Manufacturing Company, Inc., Mansfield, OH (US)

( * ) Notice: Subject to any disclaimer, the term of this patent is extended or adjusted under 35 U.S.C. 154(b) by 506 days.

(21) Appl. No.: 12/701,134

(22) Filed: Feb. 5, 2010

(65) Prior Publication Data

US 2010/0215449 A1  Aug. 26, 2010

Related U.S. Application Data

(60) Provisional application No. 61/150,179, filed on Feb. 5, 2009.

(51) Int. Cl.
| | | |
|---|---|---|
| *E21B 7/02* | (2006.01) | |
| *B23B 39/16* | (2006.01) | |
| *E21B 15/04* | (2006.01) | |
| *E01C 23/04* | (2006.01) | |
| *E01C 7/02* | (2006.01) | |
| *B23B 39/14* | (2006.01) | |
| *B28D 1/14* | (2006.01) | |
| *E21B 7/00* | (2006.01) | |

(52) U.S. Cl.
CPC ............ *B23B 39/161* (2013.01); *B23B 39/14* (2013.01); *B28D 1/14* (2013.01); *E01C 7/02* (2013.01); *E01C 23/04* (2013.01); *E21B 7/02* (2013.01); *E21B 15/04* (2013.01); *E21B 7/002* (2013.01); *Y10T 408/03* (2015.01); *Y10T 408/35* (2015.01); *Y10T 408/38* (2015.01); *Y10T 408/385* (2015.01); *Y10T 408/91* (2015.01)

(58) Field of Classification Search
CPC ............ E01C 7/02; E01C 19/00; E01C 23/00; E01C 23/04; E01C 23/12; E21B 7/02; E21B 7/025; E21B 7/002; E21B 15/04; E21B 15/045; B23B 39/14; B23B 39/161; B62D 49/0678
USPC .. 173/44, 28, 27, 184, 189, 190, 193, 1, 42, 173/187; 180/209, 435, 202, 24.02; 280/43, 638; 175/202; 299/39.6, 39, 40
See application file for complete search history.

(56) References Cited

U.S. PATENT DOCUMENTS

| | | | | | |
|---|---|---|---|---|---|
| 4,392,541 | A | * | 7/1983 | Barchard | 180/209 |
| 4,589,499 | A | * | 5/1986 | Behrens | 173/184 |
| 5,121,808 | A | * | 6/1992 | Visentini et al. | 180/435 |
| 5,190,398 | A | * | 3/1993 | Swisher, Jr. | 404/90 |
| 5,354,147 | A | * | 10/1994 | Swisher, Jr. | 299/39.6 |
| 5,540,292 | A | * | 7/1996 | Behrens | 173/184 |
| 5,954,143 | A | * | 9/1999 | McCabe et al. | 173/184 |
| 6,082,469 | A | * | 7/2000 | Kromray, Jr. | 173/184 |
| 6,435,766 | B1 | * | 8/2002 | Titford | 404/75 |
| 6,481,507 | B1 | * | 11/2002 | Kromray, Jr. | 173/184 |
| 7,624,831 | B2 | * | 12/2009 | Orr et al. | 180/167 |

*Primary Examiner* — Scott A. Smith
(74) *Attorney, Agent, or Firm* — Vorys, Sater, Seymour and Pease LLP; Mark A. Watkins

(57) ABSTRACT

Disclosed is an automated drill apparatus composed of one or more gang drills mounted to a gang drill chassis, at least one powered drive wheel affixed to the gang drill chassis, and at least three pivotable support wheels. A control panel provides remote operation of drill rotation activation, drill advance, and drill bed position adjustment, and a panic off switch. A control system implements steering the automated drill apparatus and is selectable by the operator for steering in two-wheel mode or crab steer mode. The pivotable drive wheels, in conjunction with the control panel and control system, are used to position the automated drill apparatus along a slab to be drilled, and further activate one or more gang drills for drilling a slab.

13 Claims, 14 Drawing Sheets

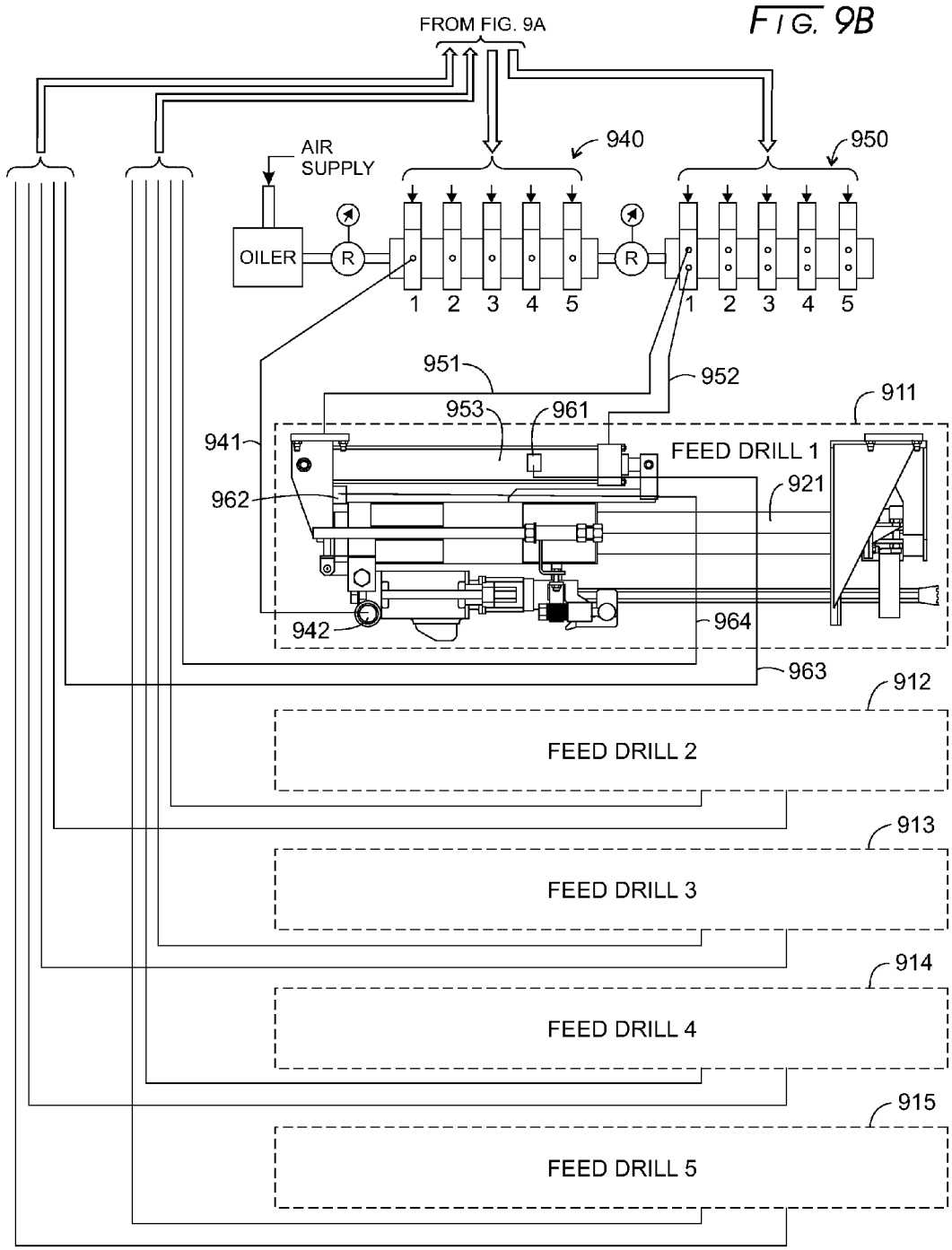

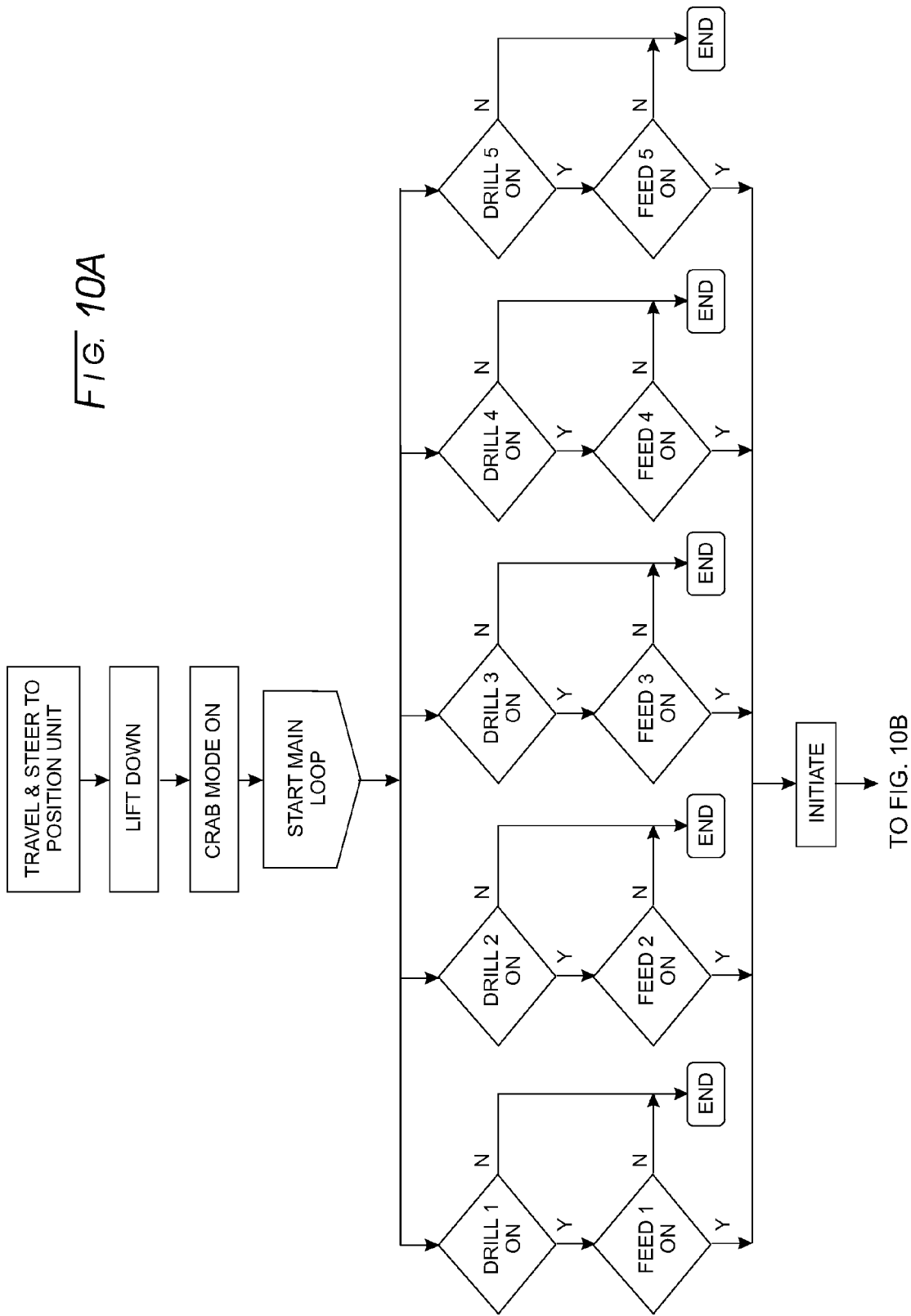

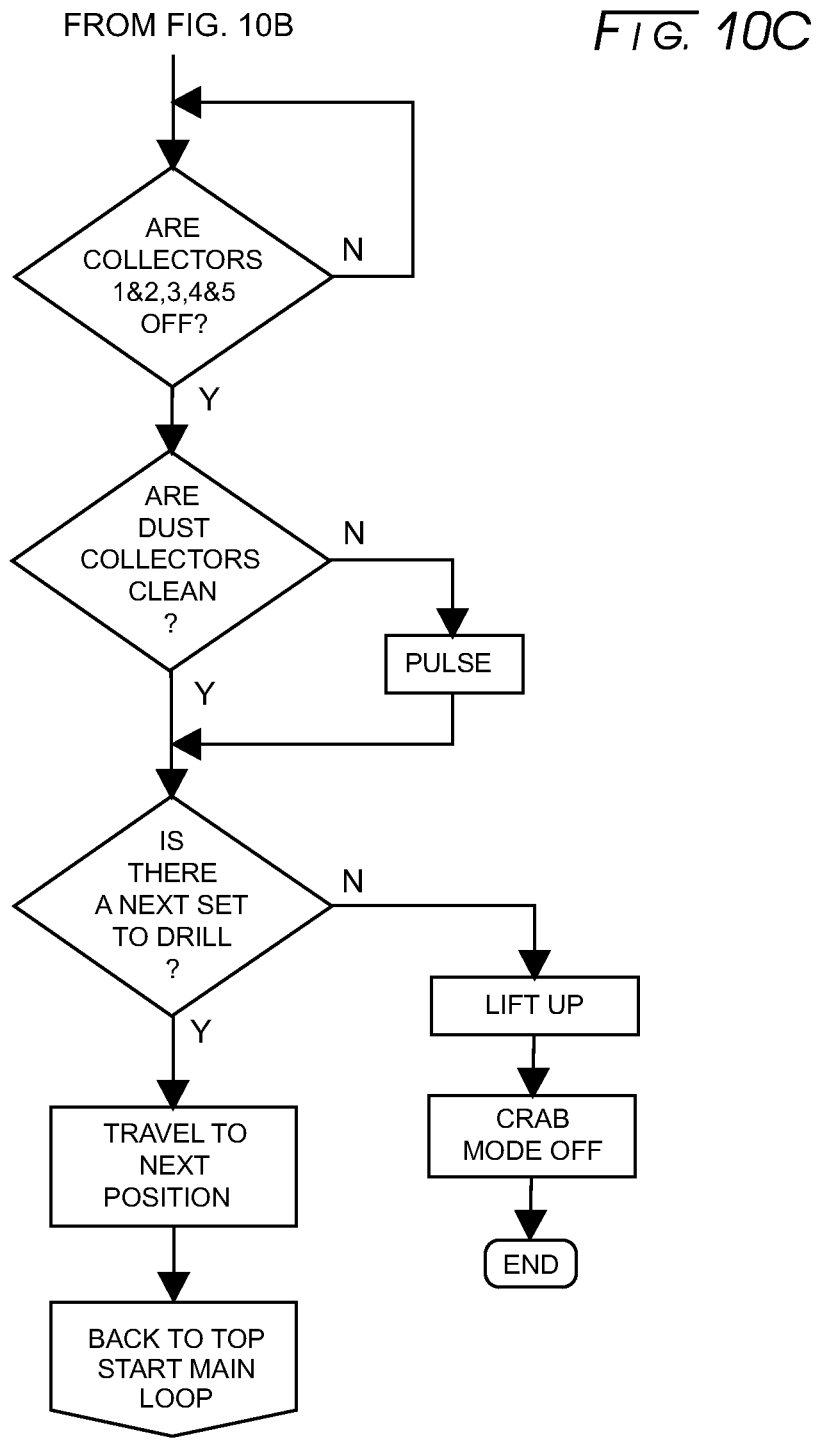

DRILLING APPARATUS

CROSS-REFERENCE TO RELATED APPLICATIONS

This application claims the benefit of the U.S. provisional patent application, Ser. No. 61/150,179, filed Feb. 5, 2009, the disclosure of which is expressly incorporated herein by reference.

STATEMENT REGARDING FEDERALLY SPONSORED RESEARCH

Not applicable.

FIELD

The apparatus disclosed and claimed herein generally relates to improved machinery for drilling operations, and particularly to a system, method, and apparatus for conducting remote semi-automated drilling operations.

BACKGROUND

Many construction jobs require holes to be drilled into concrete or other dense material. Commonly, such drilling requirements further demand holes to be drilled in groups containing multiple drill holes, or as individual holes or groups of holes separated by predefined lengths.

For instance, drilling holes into bridge parapets for placement of railing is extremely difficult with hand drills—even the use of larger wheeled drills is difficult. Additionally, roadway and runway construction often requires dowel pin holes to be drilled during the construction or repair process. These and other drilling operations must be carried out repeatedly, so there is a need for a drill apparatus that can drill a number of holes in succession with minimal amounts of drill alignment and machine adjustment by the operator, thereby enabling increased throughput production levels.

In many situations, operating drilling machinery is difficult or dangerous because the drilling surface orientation makes it difficult for the operator to view or monitor the drilling operation while operating the drilling apparatus. Thus, a drilling method and apparatus that would allow an operator to control drilling machinery from a safe location while also allowing close monitoring of the drilling process is needed.

SUMMARY

Disclosed is an automated drill apparatus composed of one or more gang drills mounted to a gang drill chassis, at least one powered drive wheel affixed to the gang drill chassis, and at least three pivotable support wheels. A control panel provides remote operation of drill rotation activation, drill advance, bed position adjustment, and a panic off switch. A control system implements steering the automated drill apparatus and is selectable by the operator for steering in two-wheel mode or crab steer mode. The pivotable drive wheels, in conjunction with the control panel and control system, are used to position the automated drill apparatus along a slab to be drilled, and further activate one or more gang drills for drilling a slab.

BRIEF DESCRIPTION OF THE DRAWINGS

For a fuller understanding of the nature and advantages of the present apparatus, reference should be had to the following detailed description taken in connection with the accompanying drawings, in which.

The drawings will be described in greater detail below.

DETAILED DESCRIPTION

Figure 1:
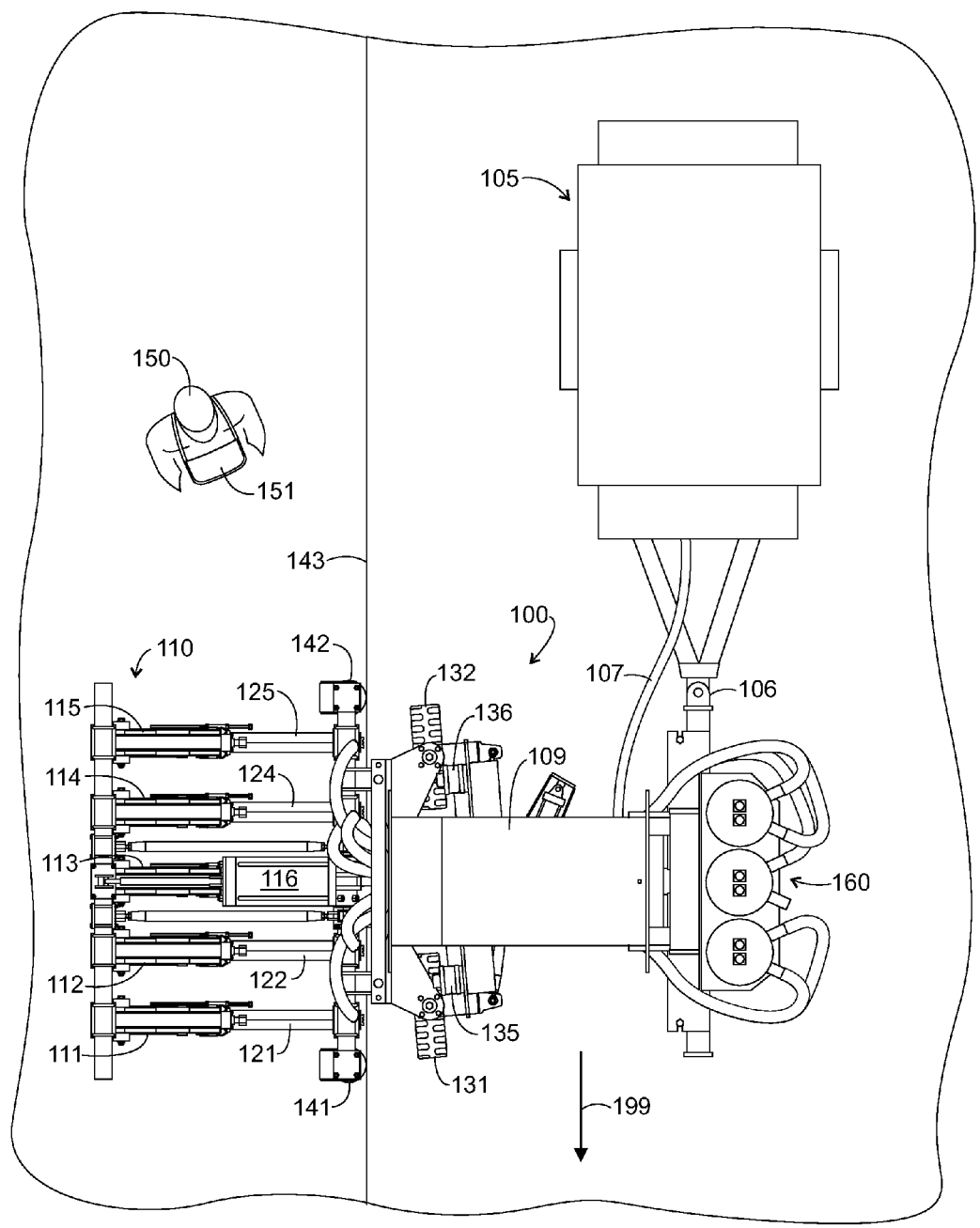
FIG. 1 is an overhead view of a cantilever dowel pin embodiment of the remote automated gang drilling apparatus.
Figure 2:
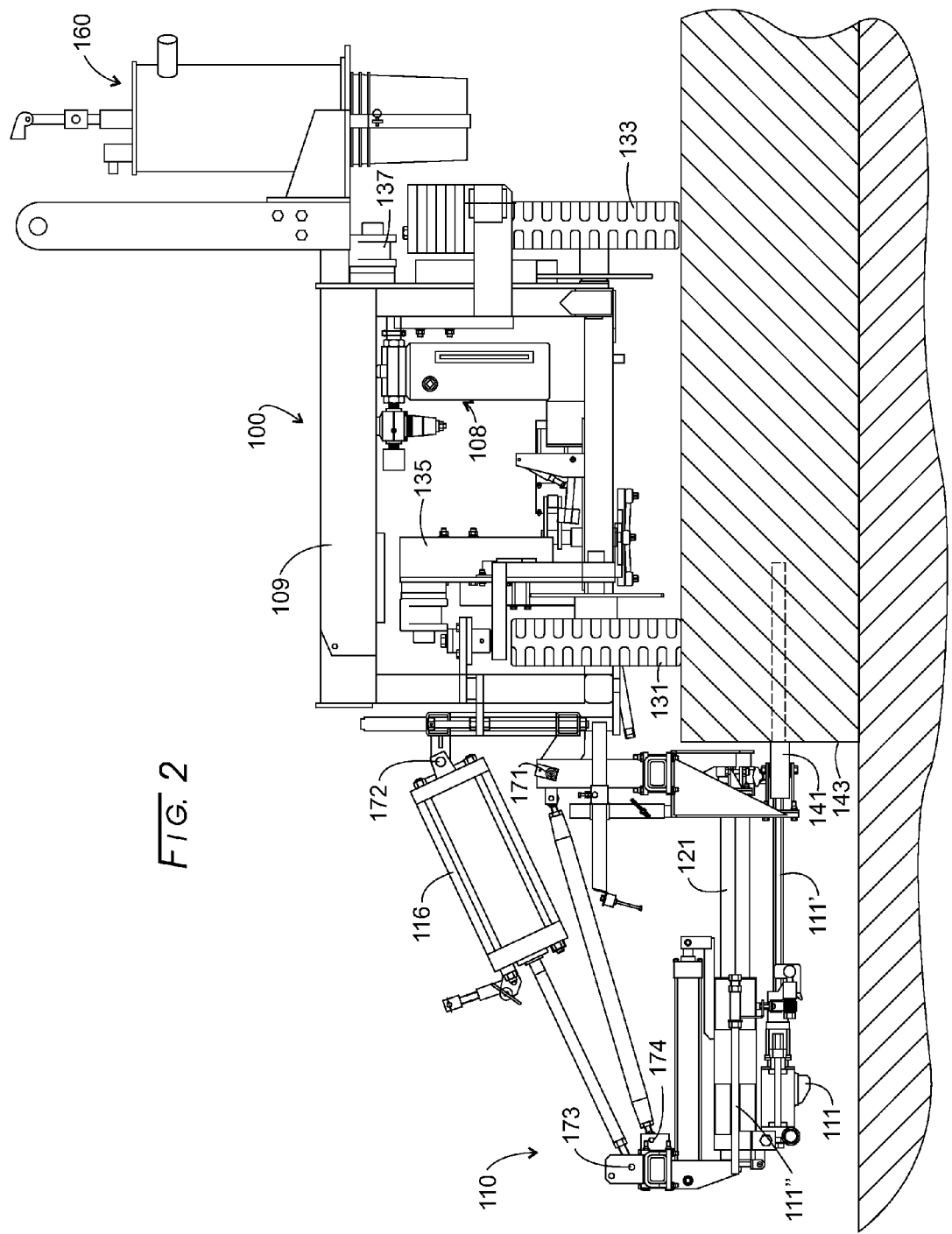
FIG. 2 is a front view of a cantilever dowel pin embodiment of the remote automated gang drilling apparatus, with the gang drill bed in the drilling position.
Figure 3:
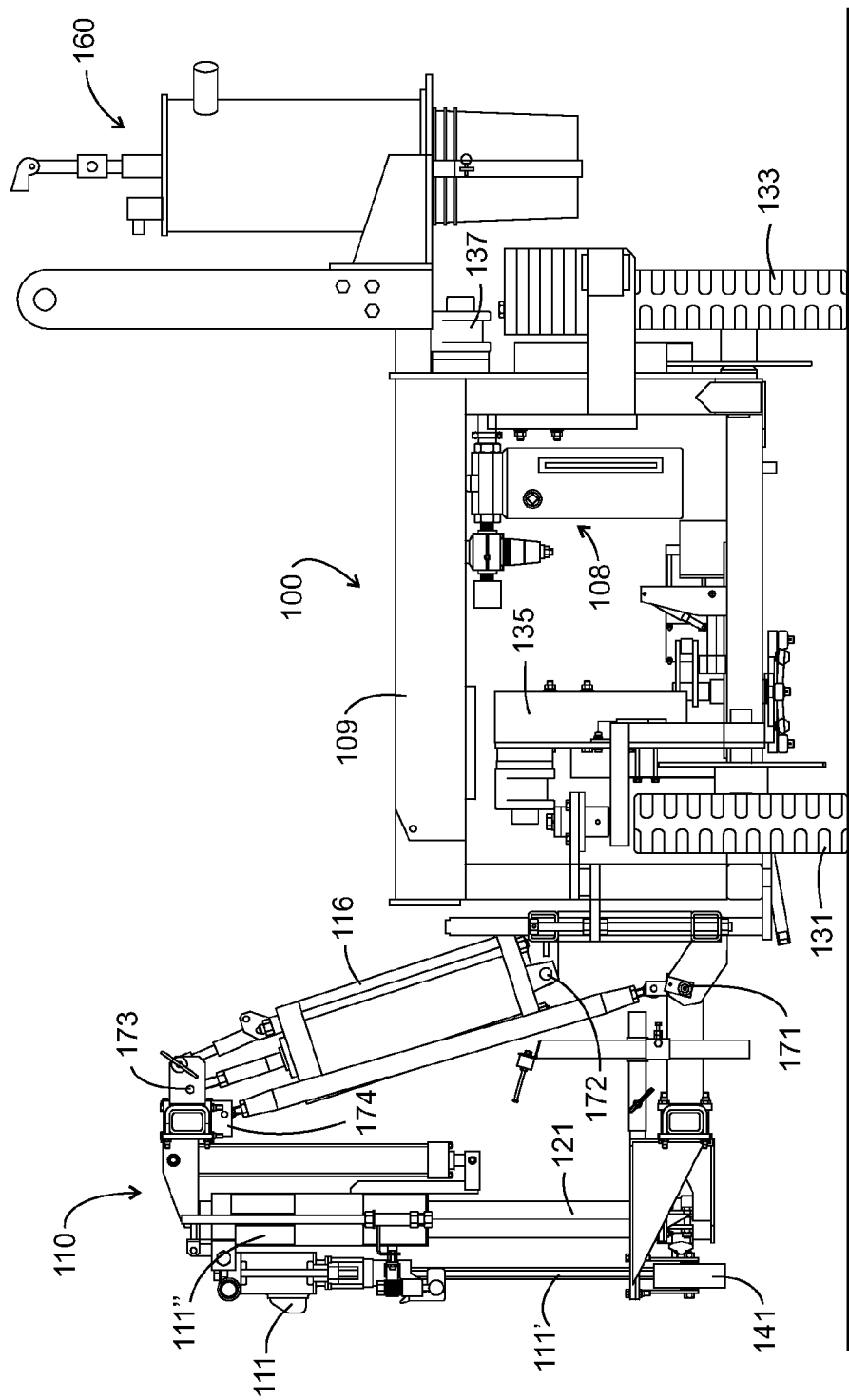
FIG. 3 is a front view of a cantilever dowel pin embodiment of the remote automated gang drilling apparatus with the gang drill bed in the lifted position.
Figure 4:
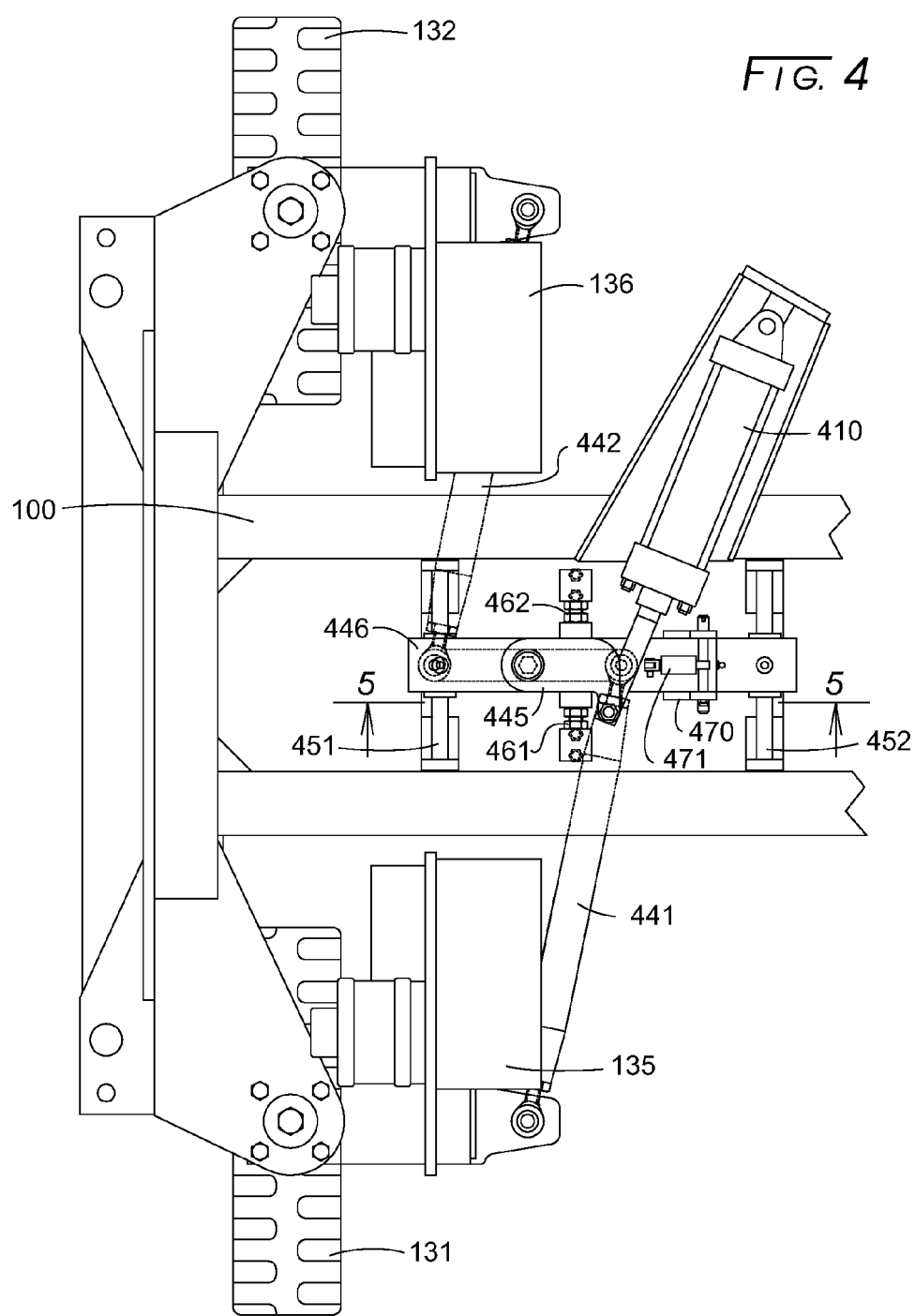
FIG. 4 is an overhead cutaway view of the crab steer interlocking mechanism in center position on a cantilever dowel pin embodiment of the remote automated gang drilling apparatus.

Disclosed herein are a new system, method and apparatus for conducting remote semi-automated drilling operations. The disclosure is particularly drawn to a remotely controlled semi-automated gang (i.e., multiple drill head) drilling apparatus. FIGS. 1-3 depict one embodiment of the apparatus in a remotely operated, five-drill, self-propelled, cantilevered gang drill apparatus. The automated gang drill apparatus comprises a) one or more drills mounted on a gang drill bed, in turn mounted on a gang drill chassis; b) a plurality of support wheels affixed to the gang drill chassis, with at least one support wheel being a powered drive wheel, and at least two pivotable support wheels; c) a control system that provides for the remote operation of drill rotation activation, drill feed advancement, motive controls, and a panic off switch; d) a control system for steering the apparatus that is selectable by the operator for steering in regular steer mode or crab steer mode.

Figure 11:
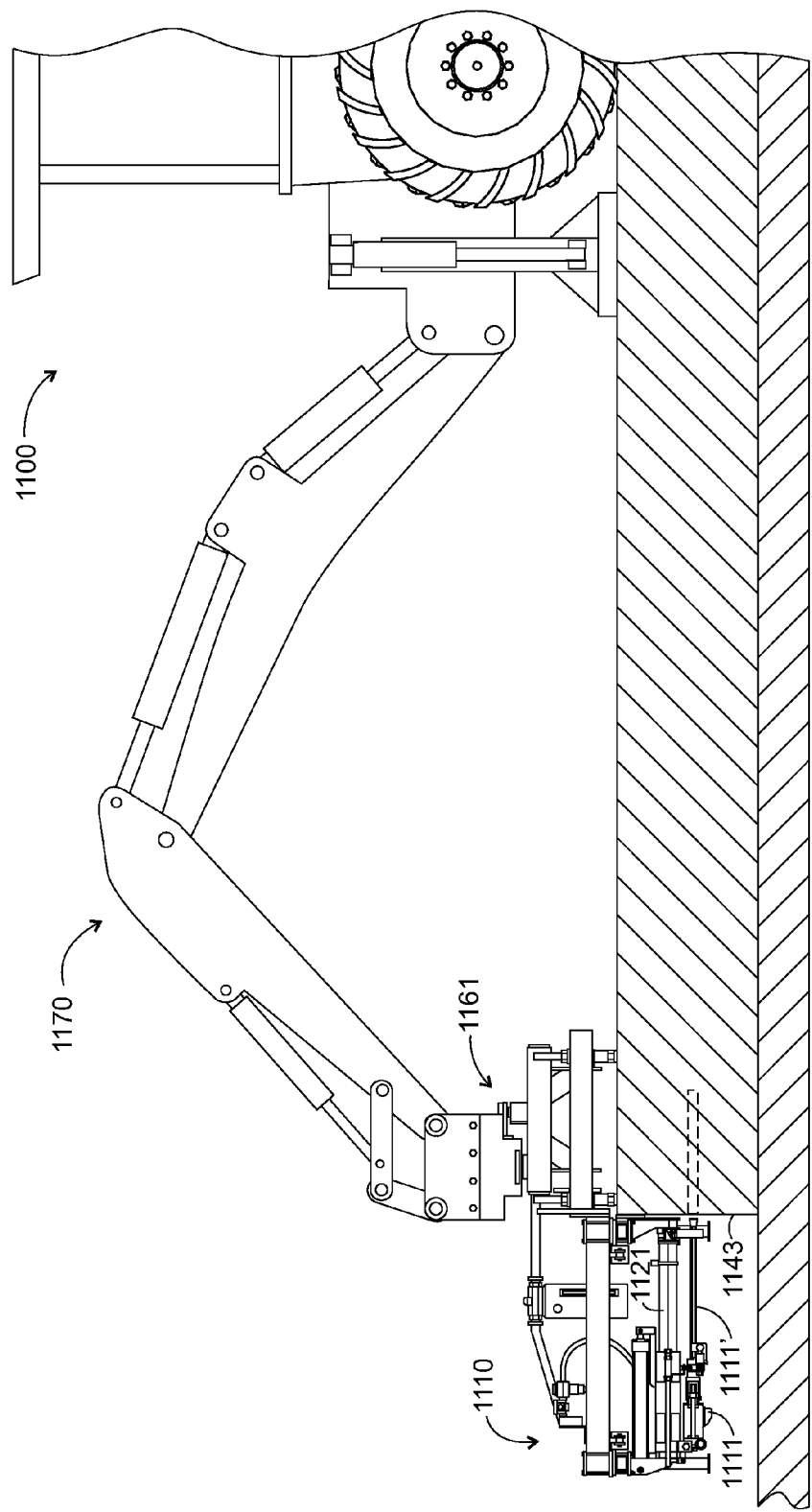
FIG. 11 is a side view of a second preferred embodiment of the apparatus utilizing a backhoe as the motive means.

FIG. 11 depicts a second embodiment of the remote semi-automated gang drilling apparatus, in which the gang drill bed is mounted on commercially available backhoe machinery to provide motive means. Numerous further embodiments may utilize the disclosed embodiments—embodiments such as a drill chassis configured for mounting on bridge wall parapets for retrofitting bridge parapets to a current design standard. The parapet wall drill (or vertical slab drill) depicted in FIG. 12 as a third embodiment is useful for such retrofitting applications. The State of Ohio, for example, has a policy to update bridge barrier walls when a rigid overlay is placed on a bridge. The policy is expected to continue until all old barriers are brought up to current crash test requirements.

FIGS. 1-3 generally depict a first embodiment of the present disclosure in a cantilevered gang drill apparatus. FIG. 1 is an overhead view of the embodiment in position to drill holes in the vertical drilling surface 143. FIG. 2 is a front view of the embodiment with the drilling bed 110 also deployed to drill holes in a vertical drilling surface, 143. FIG. 3 is a front view of the embodiment with a drilling bed, 110 in the lifted (or travel) position.

FIG. 1 shows an air compressor, 105, hitched to the cantilevered gang drill at a hitch, 106. A main air supply hose, 107, connects air compressor 105 to the gang drill, providing pneumatic power to its mechanical parts. While the use of pneumatics to drive the apparatus may be the preferred solution in this particular embodiment, it is evident to those skilled in the art that other driving methods may be employed. Pneumatic power is commonly used for concrete drilling applications, where pressure requirements rarely exceed 500 kPa. Those skilled in the art will recognize that parameters such as the required pressure range of a particular application and general convenience requirements affect the choice of applicable power supply. Others methods may include, for example, the use of hydraulic power. FIG. 11 depicts an embodiment of the present disclosure as an instance in which the use of hydraulic power may prove more convenient to those making and using the disclosed apparatus. Machinery, such as, for example an excavator and backhoe, 1100, commonly utilize hydraulically powered attachments, often incorporating simplified quick mounting systems for affixing such tools at the end of a two-member articulating arm, 1170. A drilling bed, 1110, can easily be attached to such machinery through the use of a simple attachment bracket, 1161.

Referring now to FIGS. 1-3, the cantilever gang drill as pictured consists primarily of three main components: a gang drill chassis, 100, a gang drill bed, 110, and a power provider—in this case an air compressor, 105. Gang drill chassis 100 provides the main structural support for components and overall system motive means for the apparatus through drive wheels. The preferred embodiment utilizes a front pivotable drive wheel, 131, a rear pivotable drive wheel, 132, and a fixed drive wheel, 133, each driven (pneumatically powered) respectively by a front wheel drive system, 135, a rear wheel drive system, 136, and a fixed wheel drive system, 137. Front 135, rear 136, and fixed 137 wheel drive systems use compressed air systems to translate linear motion to rotational motion as is commonly known in the art. Two of the three wheels contain a braking system, also pneumatically powered, that is engaged until disengaged by initiating the drive system.

Gang drill chassis 100 also houses the system controls in a system control housing, 109, and an air pressure regulator, 108, to which an air compressor, 105 is connected via an air supply hose, 107. In many circumstances, gang drill chassis 100 also will have a dust collection system, 160, mounted on it, to enable the collection of excess dust from the drill holes during drilling operations, as is often required by safety standards and laws.

Gang drill bed 110 is affixed to and supported by gang drill chassis 100 at a drill bed attachment point, 171, and a bed position control cylinder attachment point, 172. The gang drill bed is raised or lowered by utilizing a four bar linkage configuration with pivot points, 171 and 172, fixed with respect to gang drill chassis 100 and pivot points, 173 and 174, fixed with respect to gang drill bed 110. Bed position control cylinder then extends or contracts to lower gang drill bed 110 into the cantilevered position for drilling (FIG. 2) or raise it into the travel position (FIG. 3).

A first pneumatic drill, 111, second pneumatic drill, 112, third pneumatic drill, 113, fourth pneumatic drill, 114, and fifth pneumatic drill, 115, each is mounted on gang drill bed 110. First pneumatic drill 111 contains/uses a drill bit, 111', which is advanced during a feed operation by a first pneumatic drill cylinder, 111", along a structural axis, 121. Each individual pneumatic drill utilizes similar components to drill into a vertical drilling surface, 143. Gang drill bed 110 contacts vertical drilling surface 143 at a front, 141, and a rear, 142, guide wheels, which provide proper spacing and support to gang drill bed 110. Guide wheels 141 and 142 advance along vertical drilling surface 143 in the direction of travel by "crabbing" a cantilever gang drill forward, 199. Crabbing the gang drill at an angle away from vertical drilling surface 143 causes drill bed 110 to be pulled against drilling surface 143, ensuring that drill bed 110 stays flush against drilling surface 143 during drilling operations.

Because it is useful to provide both a crab steering mode and normal steering mode to the apparatus, the present disclosed embodiment utilizes a steering interlock, depicted in FIGS. 4-7. In normal steering mode, depicted in FIG. 6, front wheel 131 pivots in the opposite direction of rear wheel 132, causing the apparatus to turn left or right by rotating. In crab steering mode, depicted in FIG. 7, front wheel 131 and rear wheel 132 each pivot in the same direction, causing the apparatus to move left or right absent apparatus rotation. The improved drill apparatus utilizes a steering interlock to permit either normal steering mode or crab steering mode, selectable by the operator. The use of a steering interlock lessens operator confusion by requiring steering operations to be carried out independently, while simultaneously shortening the overall width required of the device by coupling the different steering mechanisms into the steering interlock.

Figure 6:
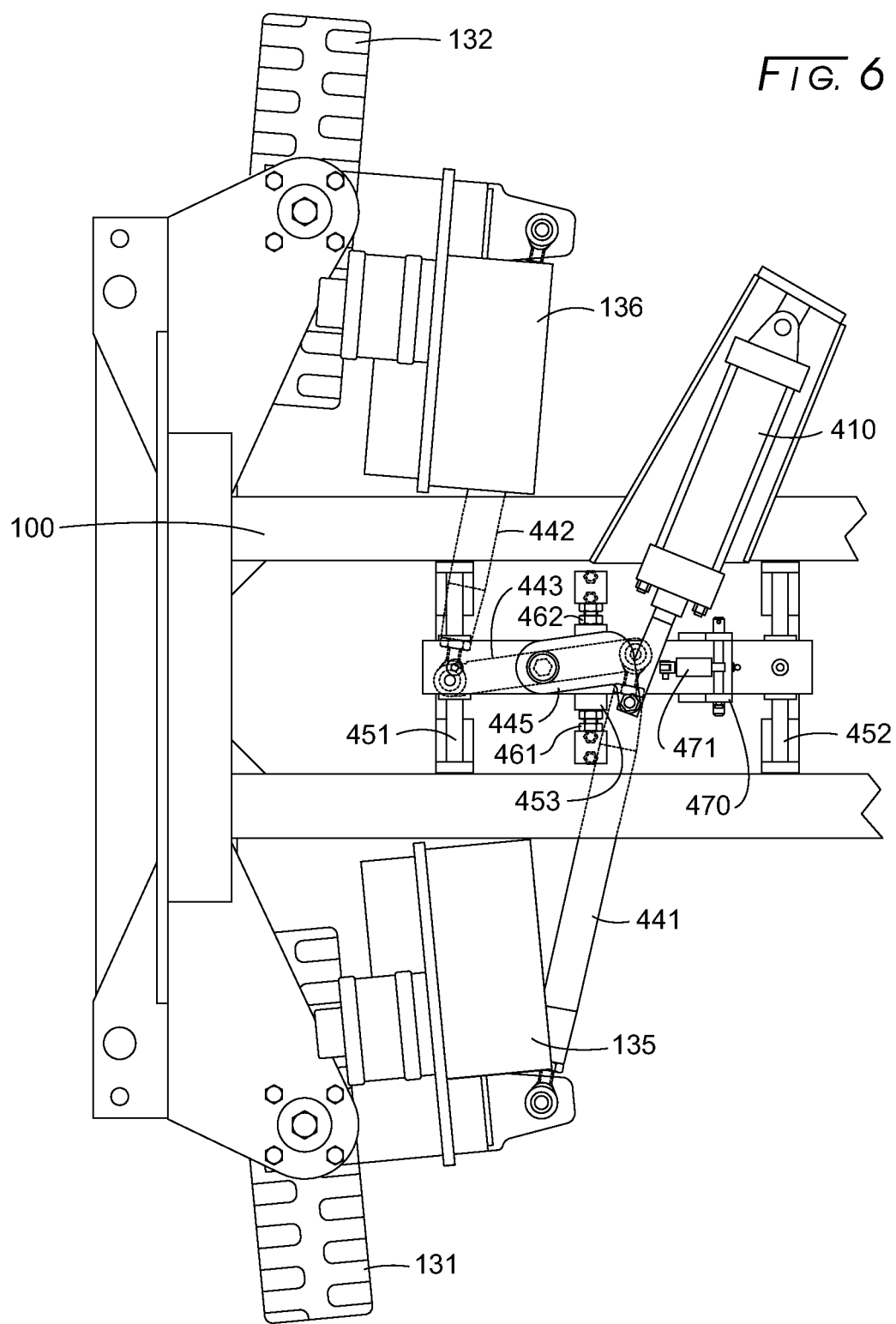
FIG. 6 is an overhead cutaway view of the crab steer interlocking mechanism in a normal steering mode.
Figure 7:
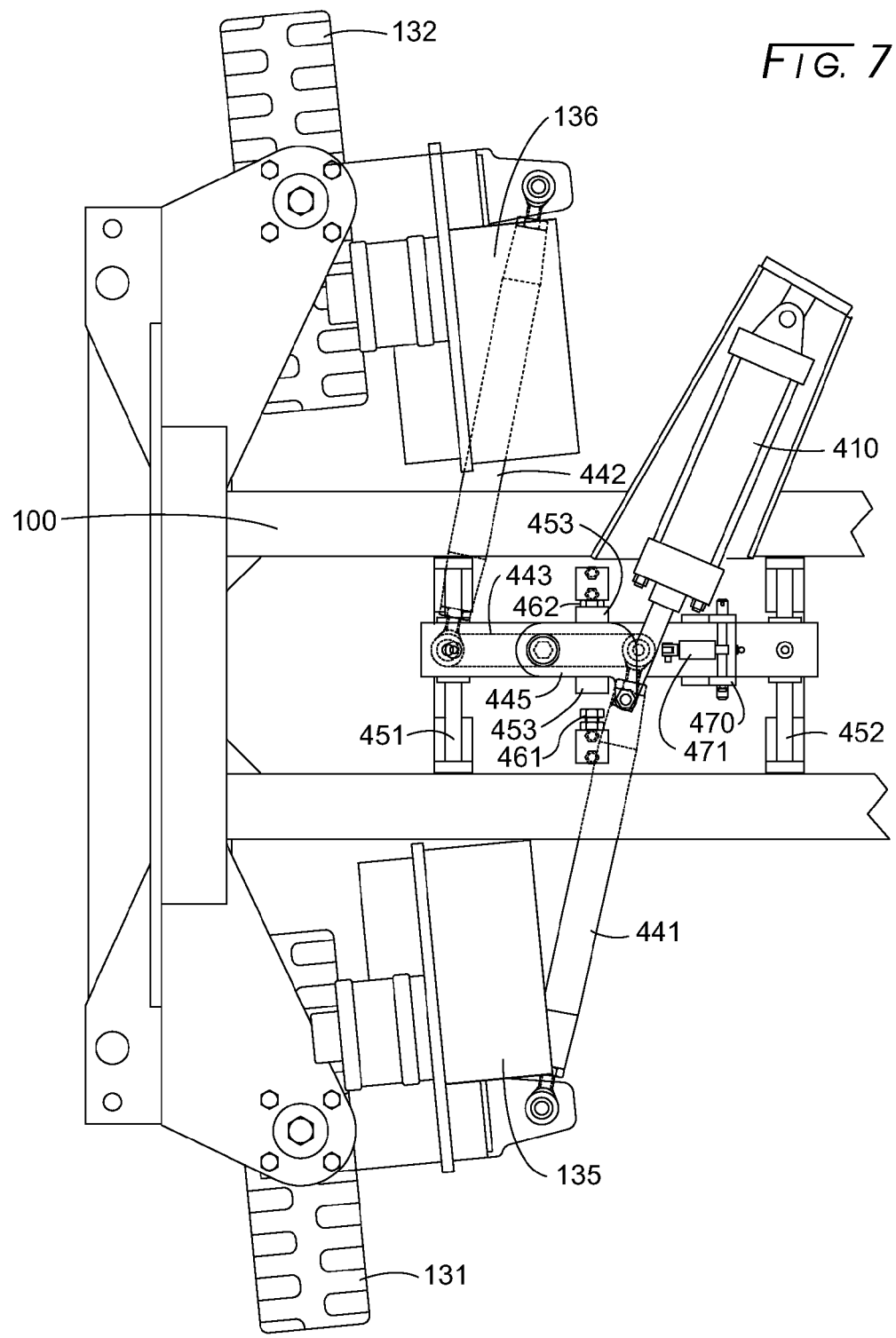
FIG. 7 is an overhead cutaway view of the crab steer interlocking mechanism in crab steering mode.

Front wheel 131 is connected to a steering linkage, 443, via a front wheel tie rod, 441. Rear wheel 132 is likewise connected to a steering linkage, 443, via a rear wheel tie rod, 442. Normal steering is achieved when steering linkage 443 rotates about a steering pivot axle, 444, and with respect to gang drill chassis 100, as depicted in FIG. 6. Alternatively, fixing the rotation of steering linkage 443 with respect to gang drill chassis 100 and affecting linear motion of steering linkage 443, as depicted in FIG. 7, induces a crab steering motion in wheels 131 and 132. In the present embodiment, steering pivot axle 444 is mounted on a steering interlock body, 446, which moves linearly along a left, 451, and right, 452, crab steer axles, which are fixed with respect to gang drill chassis 100.

Figure 5:
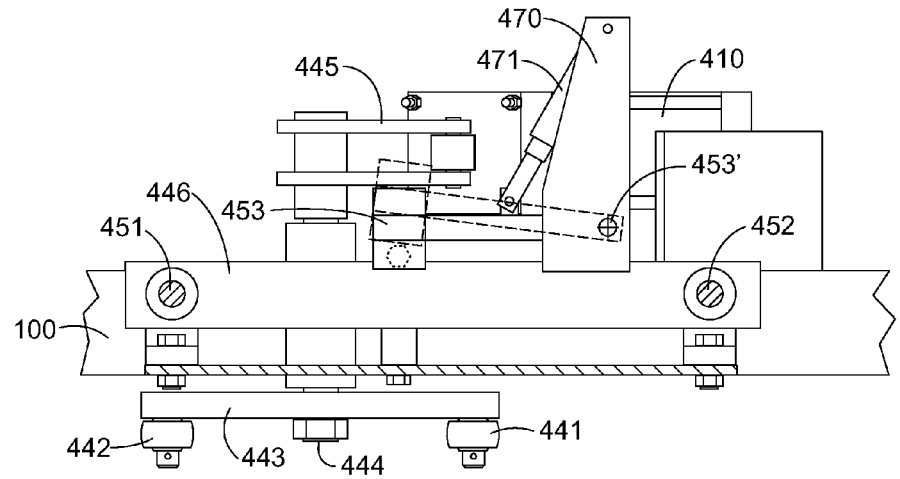
FIG. 5 is a rear sectional view of the crab steer interlocking mechanism on a cantilever dowel pin embodiment of the remote automated gang drilling apparatus.

To operably separate the normal steering mode from the crab steering mode, the present embodiment utilizes a steering interlock arm, 453, as shown in FIG. 5. Steering interlock arm 453 can be raised or lowered by actuating a steering interlock air cylinder, 471. An interlock housing, 470, is fixed to an interlock body, 446, and supports interlock air cylinder 471 and interlock arm 453, which attaches and pivots about an axis. 453'. The solid depiction of interlock arm 453 in FIG. 5 represents the lowered position (enabling normal steering mode), and the dotted line represents the raised position (enabling crab steering mode). Interlock arm 453 is positioned above interlock body 446 and comprises side flanges that extend both upwardly and downwardly from the main structure of interlock arm 453 that attaches to interlock housing 470 and air cylinder 471. In its raised position, interlock arm 453 flanges extending above its body encloses a steering control linkage, 445, and prevents a steering pivot axle, 444, and, consequentially, steering linkage 443 from rotating. This is shown in FIG. 7, where raised interlock arm 453 locks the steering mechanism into crab steering mode. Any actuation of steering control air cylinder 410 will rotate both front wheel 131 and rear wheel 132 in the same direction.

In its lowered position, interlock arm 453 locks the steering mechanism into normal steering mode. The steering interlock mechanism includes a front interlock stopper, 461, and rear interlock stopper, 462. Both front interlock stopper 461 and rear interlock stopper 462 are fixed with respect to gang drill chassis 100, and are located below interlock body 446 so as not to obstruct the forward and back linear motion required for crab steering mode. The lower portion of the flanges found on interlock arm 453 are longer than the total height of interlock body 446, such that when interlock arm 453 is in the lowered position, the lower portion of its flanges fit around interlock body 446 and extend beneath interlock body 446 and between front interlock stopper 461 and rear interlock stopper 462. In this lowered position, interlock body 446 is prevented from sliding along right crab steer axle 452 and left crab steer axle 451 and steering control linkage 445 is able to rotate. Therefore, actuation of steering control air cylinder 410 will rotate steering control linkage 445, steering pivot axle 444, and steering linkage 443, enabling normal steering mode.

Figure 8:
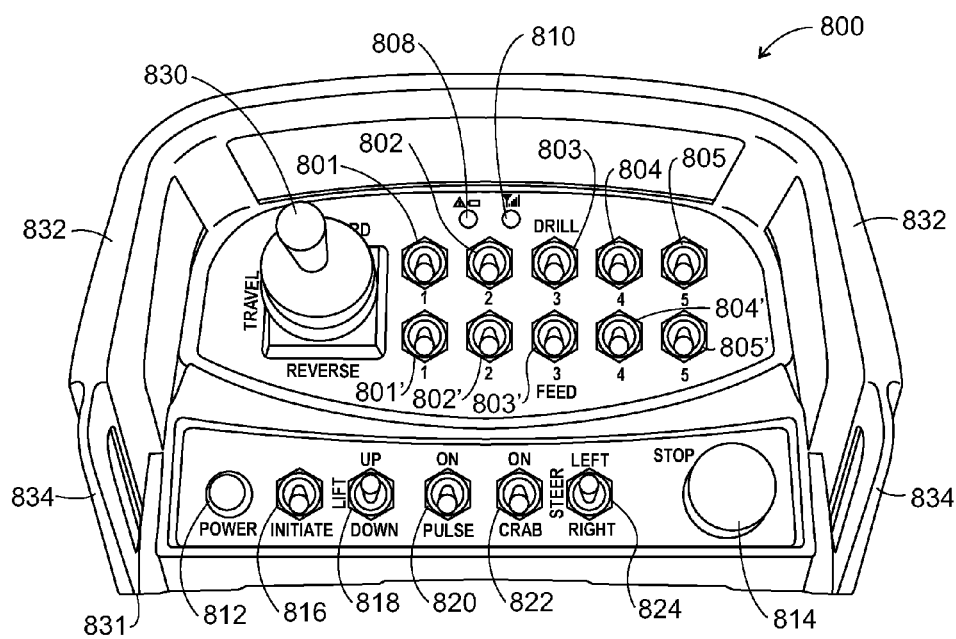
FIG. 8 is a perspective view of the wireless remote control signaling unit configured for a cantilever dowel pin embodiment of the remote automated gang drilling apparatus.

In one useful embodiment, a new remote control, adaptable for use at construction sites, is configured for use with the new dowel pin drills. The remote control panel according to the present disclosure is shown in FIG. 8. A remote control panel, 800, is separable for the drilling apparatus, and may be controlled wirelessly, or by using a wired tether. Remote 800, as shown, is configured for optimal use with the cantilever gang drill embodiment having five drills, with numbered control levers, 801-805 and 801'-805'. Standard two position toggle switches, 801-805 and 801'-805', may be configured for a number of operations, preferably for activating the rotation of individual drill heads (801-805), and the forward pressure feed that advances each of the individual drill heads (801'-805').

The preferred embodiment uses pneumatic drills 111-115 configured with separate air valves for drill rotation and drill advancement. Separating drill rotation 801-805 and drill feed 801'-805' controls in this manner allows for greater operator control and customization of the machine. For example, drill feed toggles 801'-805' can be activated while leaving drill rotation toggles 801-805 deactivated, allowing the drill bits to be seated on the drilling surface before drilling. An operator also may wish to use the separable controls to utilize only a portion of the drills during a drilling operation by choosing to leave drills 112 and 114 deactivated, for example. This is achieved by selecting the off position on toggles 802, 804, 802', and 804'.

One or more indicator lights may indicate battery level, 808, and signal strength, 810. Other indicators, such as lights for drill rotation and drill feed also may be used. In addition, a master power indicator lamp, 812, may be provided. A master stop switch, 814, is configured as the largest, most obtrusive control button, as master stop switch 814 may need to be activated in an emergency situation in order to stop all machine operations.

A remote control panel, 800, demonstrates the functionality of the drilling apparatus, with an initiate operation toggle, 816, functioning as a master activation toggle to initiate a drilling operation. A gang drill bed position toggle, 818, is a three-position center-off toggle that lifts or lowers the gang drill bed, with a center-off position. A pulse switch, 820, is a spring controlled momentary toggle that applies a pulse of compressed air to a dust collection system, 160, to clean clogged dust filters. A steering mode select switch, 822, is a two-position toggle. In the first position, a steering interlock air cylinder, 471, is extended, whereby steering interlock arm 453 is lowered, locking the steering mechanism into normal steering mode. In the second, or crab position, interlock air cylinder 471 is retracted, whereby interlock arm 453 is raised, locking the steering mechanism into crab steering mode. A steering switch, 824, is a three-position center-off toggle allowing left or right steering of the drilling apparatus by actuating steering control air cylinder 410.

A joystick, 830, allows the operator to position the apparatus by activating wheel drive systems 135, 136, and 137 to advance or reverse gang drill chassis 100. A remote control panel case, 831, is constructed preferably of durable material, such as, for example, impact resistant plastic fiberglass or pressed metal. As shown in FIG. 8, remote control panel case 831 is configured with handles, 832, for ease of use, while also protecting the controls from damage. A neck strap may also be attached at 834 to allow the operator to hang the remote in front of the body and control the machine without fatigue, or to use it as a carry strap over the shoulder. An operator, 150, is depicted in FIG. 1 using a shoulder strap to support remote control panel 151.

At certain jobsites radio traffic may interfere with the operation of wireless transmitter-based controls. At other jobsites, such as where wireless explosive detonators are in use, remotes may not be allowed to operate due to frequency interference issues. Thus, in a useful embodiment, each remote operating panel is optionally programmable to operate at a operator selectable radio ID code and each receiver is programmed only to respond to the remote with the corresponding ID code. This feature also allows several remote operating panels to be utilized in close proximity. If the job contractor is operating in an area sensitive to signal transmission, the remote operating panel can be electrically tethered by connecting a wired cord from the remote operating panel to the receiver on the drill apparatus, thereby allowing use without broadcasting radio signals.

Figure 9A:
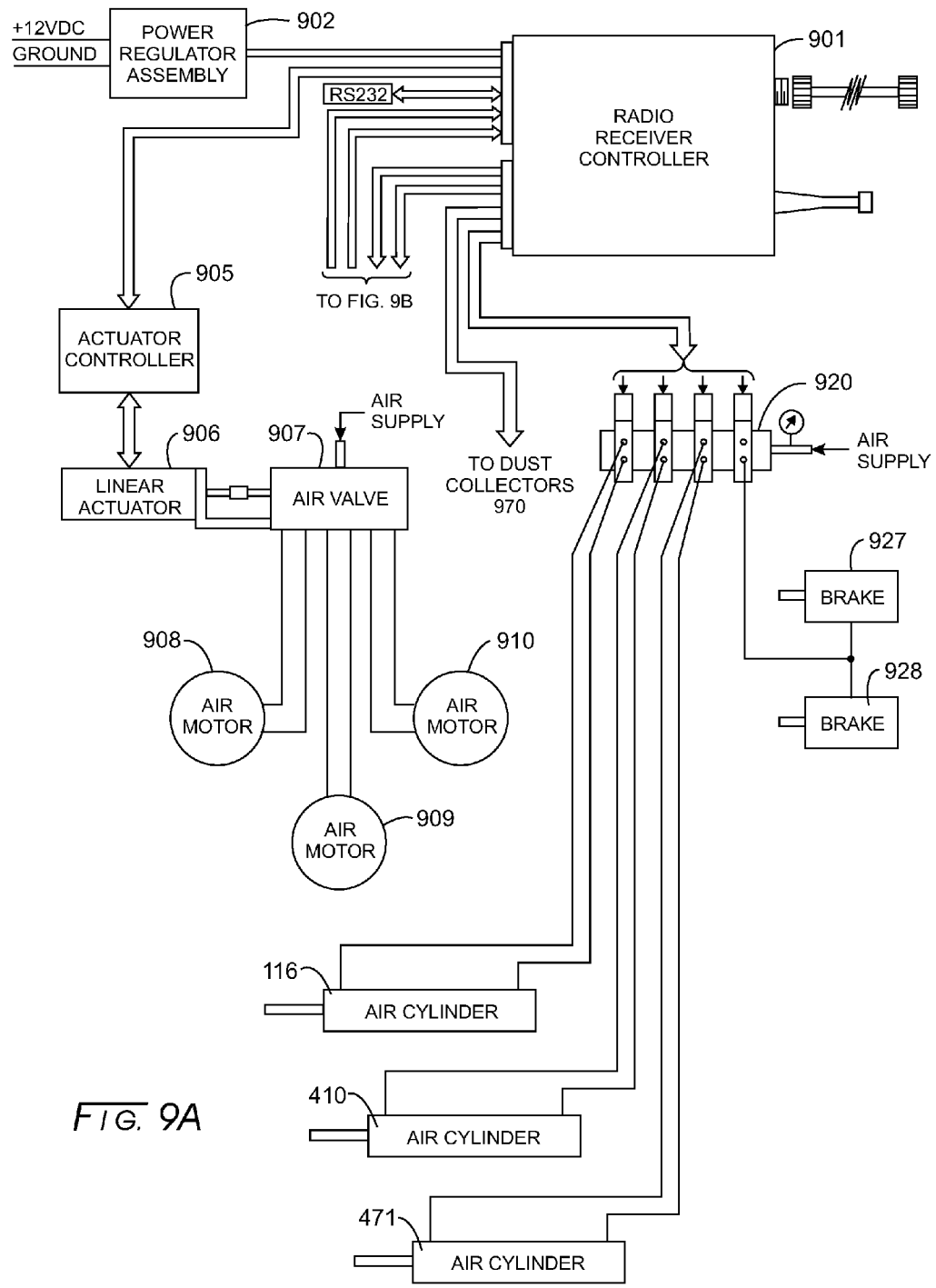
FIG. 9 is a flow diagram representing the control system configured for a cantilever dowel pin embodiment of the remote automated gang drilling apparatus.

A flow diagram representing the pneumatic control system as embodied in the five drill cantilevered gang drill apparatus is shown in FIGS. 9A and 9B. A radio receiver controller, 901, receives wireless (or wired, if so desired) signals from remote operating panel 151 (FIG. 1), and is housed in a system control housing 109 (FIG. 1). The radio receiver controller 901 is powered by a standard 12V DC power source, depicted as a power regulator assembly, 902.

Radio receiver controller 901 receives signals from remote operating panel 800 corresponding to the disposition of its individual controls. In the case of position joystick 830, receiver 901 signals an actuator controller, 905, of joystick 830 position. Actuator controller 905 then adjusts a linear actuator, 906, which opens or closes a drive air valve, 907, according to the linear position of joystick 830. The position of drive air valve 907 determines the amount of force applied to wheels 131, 132, and 133 by air motors, 908, 909, and 910, which are components of wheel drive systems 135, 136, and 137. By using a linear actuator, 906, to open and close drive air valve 907, the control system regulates the cantilever gang drill's forward and reverse speed based upon the operator's input to joystick 830. Thus, an operator may displace joystick 830 a relatively short distance from center to travel slowly, or may displace joystick 830 a relatively long distance from center to travel quickly.

In addition to actuating air motors 908, 909, and 910, signals from joystick 830 determine whether air brakes 927 and 928 are engaged or disengaged. When receiver 901 is powered on and joystick 830 is in the neutral, middle position, air brakes 927 and 928 are automatically engaged to prevent the apparatus from moving. Any out-of-center position signals received by receiver 901 from joystick 830 result in air valve 920 releasing air brakes 927 and 928, permitting the apparatus to move.

Bed position control air cylinder 116, steering control air cylinder 410, and steering interlock air cylinder 471 also are all controlled via an air valve, 920. The signal from gang drill bed position toggle 818 determines the position of the cylinder in bed position control air cylinder 116. In the center position, receiver 901 directs air valve 920 to maintain cylinder 116 position and air pressure. In the "up" position, receiver 901 directs air valve 920 to retract cylinder 116. Likewise, in the "down" position, receiver 901 directs air valve 920 to extend cylinder 116. Steering mode select switch 822 has two positions, "on" and "crab". When the switch 822 is in the "on" position, receiver 901 directs air valve 920 to fully extend steering interlock air cylinder 471, thereby enabling normal steering mode. Finally, steering switch 824 operates in the same manner as drill bed position toggle 818, as a center-off three-position toggle. In the center position, receiver 901 directs air valve 920 to maintain cylinder 410 position and air pressure. In the "left" position, receiver 901 directs air valve 920 to retract cylinder 410. Likewise, in the "right" position, receiver 901 directs air valve 920 to extend cylinder 410.

Referring to FIG. 9B, receiver 901 also controls a drill rotation air valve, 940, and a drill feed air valve, 950. If receiver 901 detects that both the drill rotation toggle for a particular drill and the initiate switch are engaged, it directs drill rotation air valve, 940, to supply the proper air pressure to the corresponding pneumatic drill. In FIG. 9B, for example, a first pneumatic drill, 911, will receive air pressure and begin to rotate when receiver 901 detects that switch 801 is in the "on" position and initiate operation toggle 816 is engaged.

FIG. 9B also depicts the control system for advancing the pneumatic drills along their support shafts. For example, first pneumatic drill 911 in FIG. 9B is advanced along a drill feed axis, 921, by a drill feed air cylinder, 953. When receiver 901 detects that both drill feed toggle 801' and initiate operation toggle 816 are engaged, it directs a drill feed air valve, 950, to increase air pressure via an air supply line, 951, thereby advancing drill 911 in the direction of the drilling surface. When receiver 901 detects that drill feed toggle 801' is disengaged and the initiate operation toggle 816 is engaged, it directs drill feed air valve 950 to increase air pressure via an air supply line, 952, thereby retracting drill 911 in the direction away from the drilling surface.

Also provided in a preferred embodiment is a quick-change depth adjustment associated with automatic feed gang drill embodiments such as drills depicted at 911-915. The quick-change depth adjustment is accomplished through the use of an automatic feed return and drill shut off system. To automatically control drill activation and drill depth, a magnet is attached to the moveable piston of the feed cylinder 953. A magnetic sensor is then attached to the cap end of the cylinder 953 at 962. Another sensor 961 is attached along the cylinder tube closer to the rod end. When the feed cylinder 953 begins to advance, the sensor 962 senses its motion and triggers the controller 901 to activate the drill rotation air valve 940 to turn on the drill rotation cylinder 942. When the magnetic piston reaches the second sensor 961, the controller 901 is again triggered to direct the drill feed air valve 950 to automatically retract the drill 911 to its home position. When the magnetic piston reaches its home position it the cap sensor 962 triggers the controller 901 to reactivate the drill rotation air valve 940 to stop the rotation of the drill 911. The depth of the drill can then be controlled by sliding the adjustable magnetic sensor 961 along the side of drill feed air cylinder 953 in order to repeatably limit the depth of drilling.

The method of remote operation of the gang drill disclosed by the present apparatus allows the operator to stand in a safe, comfortable and optimal location. For instance, during highway construction, the operator may stand in the new grade, rather than standing on the existing highway or in an exposed location on the apparatus, where collision with traffic could cause serious injury to the operator. Thus, the operator is removed of both jobsite and commuter traffic when the apparatus is used to drill dowel pin holes along an active traffic lane. Operators using the remote control panel are also able to more easily position themselves in a location that is optimal for viewing the drilling surface. These advantages increase throughput and quality by enhancing the accuracy of a drilling operation and by affording an operator with the ability to make quick and easy adjustments during any problems that may arise during the drilling operation. Operator comfort is also increased as the disclosed apparatus provides the opportunity for operators to step away from the dust and noise produced by the drilling operation.

The system may be provided with a pointer alignment system, in which a laser pointer is pointed at the next location for drilling and the apparatus automatically realigns itself with the indicated location. Alternatively, the apparatus may align itself using the previous drill holes as a reference point, at the option of the operator. The automated alignment system also improves throughput of drilling by allowing the machinery to be repositioned along a slab rapidly for continued drilling.

In certain situations, the gang drill is needed to operate with the drills arrayed vertically. The apparatus may also be configured to operate wherein a slab being drilled is a vertically oriented slab, and the apparatus being advanced automatically into a programmed position for drilling successive gangs of holes.

Figure 12:
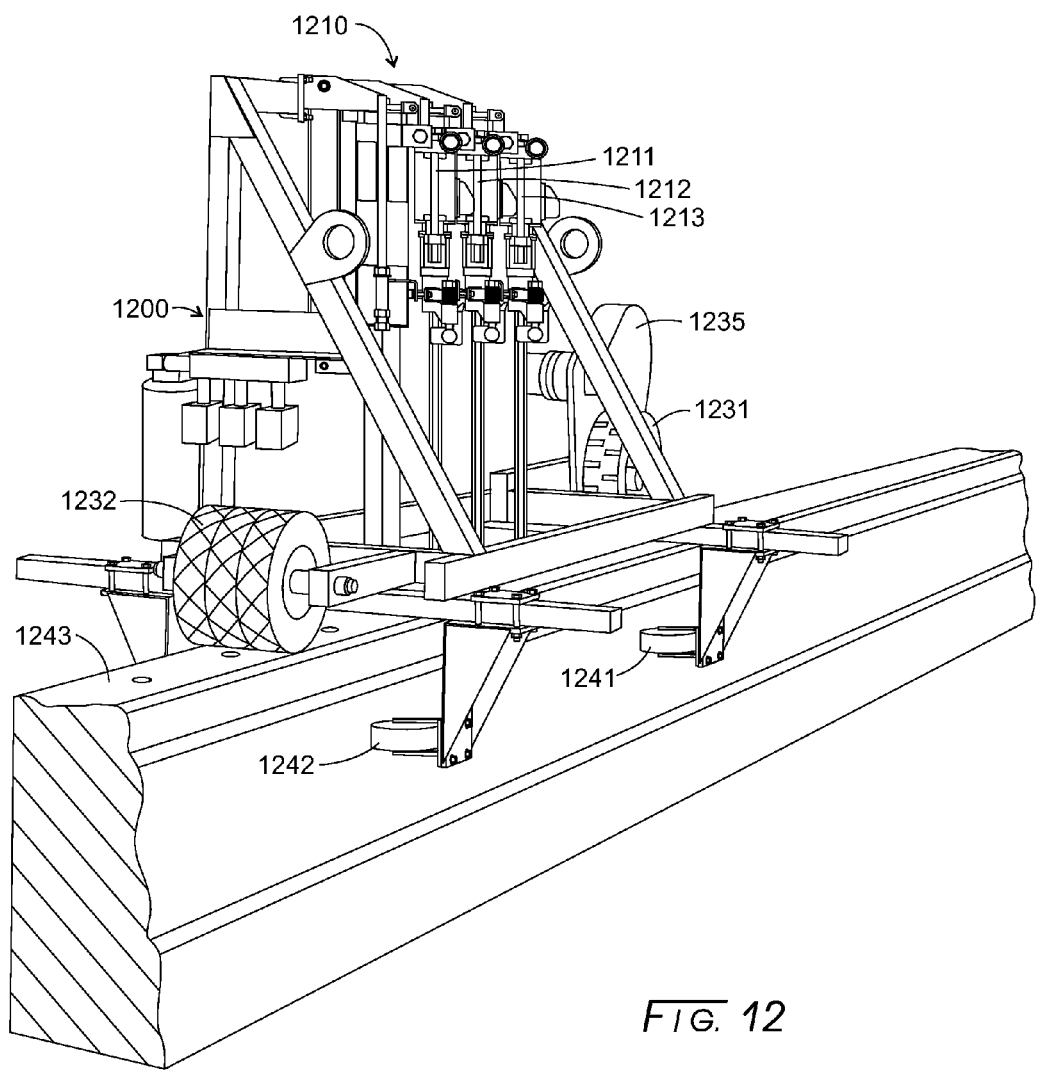
FIG. 12 is a perspective view of a third preferred embodiment of the apparatus configured to mount parapet walls.

FIG. 12 shows a perspective view of a three drill vertical gang drill unit supported by a vertical gang drill chassis, 1200, into which a gang drill bed, 1210, is integrated. Drill bed 1210 supports three drilling heads, 1211-1213. As shown in this embodiment, four adjustable sidewall guide wheels (two of which are visible at 1241 and 1242) are used with the apparatus to retain the drilling apparatus on top of the parapet as the apparatus travels along the parapet. Drive wheels, 1231 and 1232, support the gang drill apparatus and roll along a horizontal drilling surface, 1243. The front drive wheel is powered through a wheel drive, 1235, bolted to chassis 1210, providing the motive means for the horizontal surface gang drill to travel along a parapet or vertical slab.

The new pneumatic drill unit shown in FIG. 12 is capable of drilling three holes simultaneously. The drill unit is set on top of the parapet wall to drill vertically into the top of the wall. The operator activates the apparatus to drill a set of holes; the system self advances using wheel drive 1235 to travel to along the wall to the next drilling location. The next drilling location is operator selectable, and positioning of the apparatus may be automatically accomplished through use of, for instance, optical sensors, 1290, which may be installed at both or either end of chassis 1200. Testing of the apparatus demonstrated that the new drill unit was timed at 40 seconds to drill three 7/8"×12" deep holes and reposition to next set of three holes.

Figure 10B:
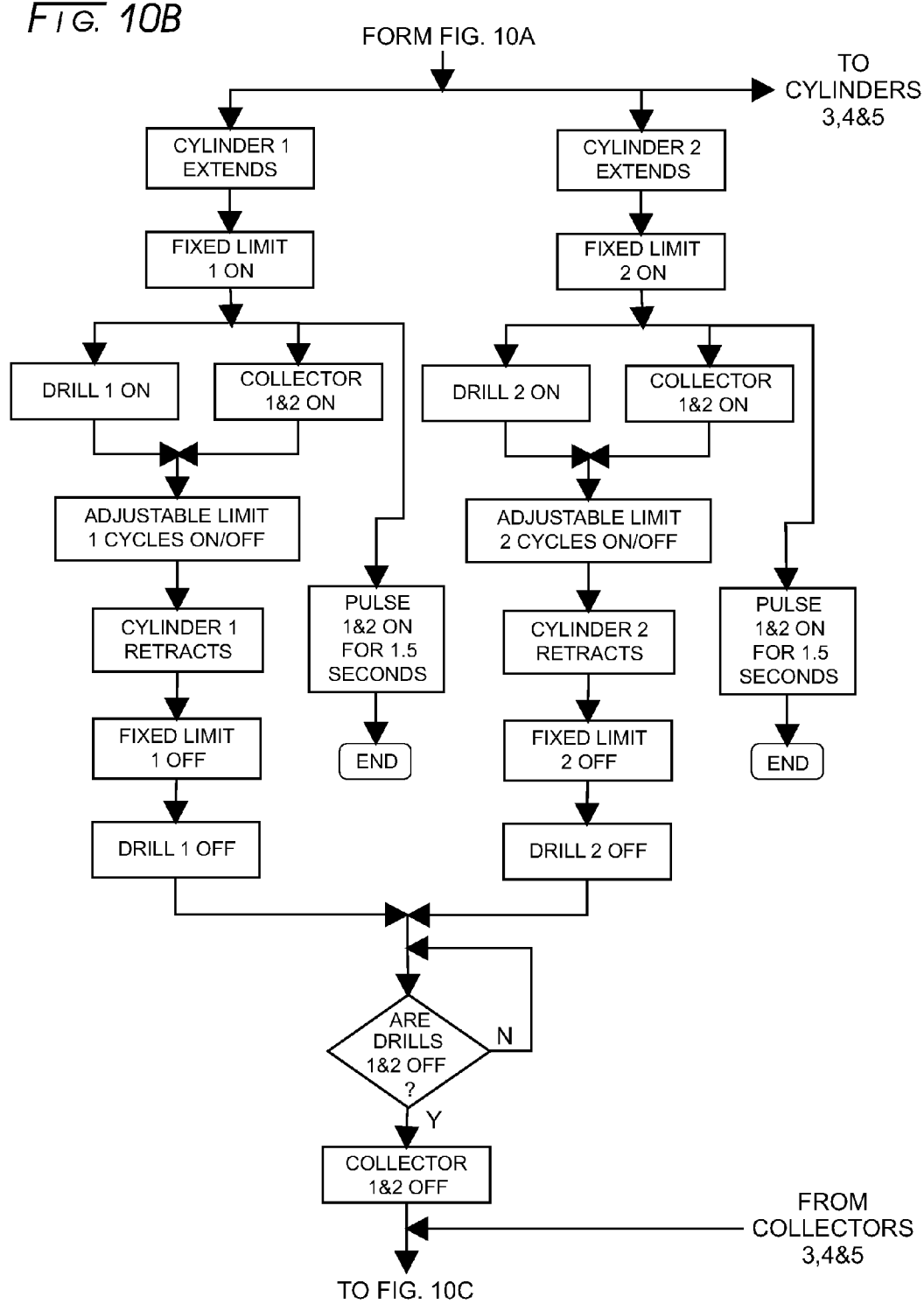
FIG. 10 is a flow diagram representing the system and method for drilling as used for one cycle of drilling in the cantilever dowel pin embodiment.

One iteration of a drilling operation performed by a preferred embodiment of the invention is shown in FIGS. 10A-10C. The example is demonstrated through the cantilevered gang drill apparatus embodiment. To begin a drilling operation, the operator uses the travel and steer controls to position the apparatus at the edge of a concrete slab, shown at 1000. The operator then activates the gang drill bed position toggle to lower the drill bed into drilling position flush against the drilling surface, as in 1001. The operator then selects crab steer mode with the control toggle, as in 1002, switching from normal steer mode that was used to initially position the apparatus. The drilling operation is then initiated when the operator toggles the initiate toggle switch, which starts the main logic loop at 1003.

The system controller first checks the status of each drill rotation toggle and drill feed toggle. For example, the controller determines if the drill rotation toggle is activated for the first drill at 1005 and whether the drill feed toggle is activated for the first drill at 1006. If either toggle is off, the controller does not activate the drill and ends the process for that particular drill in the gang, as at 1007. If the drill toggles are activated, the drill is initiated, as at 1010. The gang is initiated, as at 1010, after the controller has checked all of the drill toggle switches.

The process then moves to FIG. 10B where, after initiation at 1010, the controller extends the position cylinder for each drill that is being initiated, shown for instance at 1011 for the first drill. Directly after the magnetic piston begins to move away from the fixed limit magnetic sensor, the sensor detects the movement at 1012 at activates the drill rotation cylinder at 1013. The triggering of the sensor also activates the dust collectors, as at 1014. A one-time automatic reverse air pulse is initiated for 1.5 seconds to clean the dust collector air filters, as at 1015, and ending at 1016.

Once the magnetic piston in the drill feed air cylinder reaches the adjustable limit magnetic sensor, as at 1017, the controller reverses the direction of the drill feed air cylinder and retracts the drill, as at 1018. The drill eventually reaches the home position, again activating the fixed limit magnetic sensor, at 1019, which signals the controller to deactivate the drill rotation cylinder, as at 1020. These processes occur simultaneously for the other drills in the gang.

Once the controller determines that all drills are off and in their home position, as at 1021, the dust collectors are deactivated, as at 1022. Similarly, the dust collectors associated with drills three, four and five are deactivated, as at 1023. The operator is then given the opportunity to determine whether the dust collectors are clean, as at 1024, and to manually pulse the filters with air, as at 1025. This manually pulse can occur at any time separable from this particular depiction, as well.

The operator can then determine if there are more locations to drill at this worksite, as shown in 1026. If there are additional drilling locations, the operator will raise the gang drill bed into the travel position using the control panel, as shown in 1027, and cycle back to the beginning of the logic loop at 1028, to 1000. If the drilling operations have been completed, the gang drill bed is raised into the travel position, as shown in 1030, and normal steering is selected, as shown in 1031. As shown in box 1032, the iteration is over and the apparatus can be stored away.

While the apparatus has been described with reference to preferred embodiments, those skilled in the art will understand that various changes may be made and equivalents may be substituted for elements thereof without departing from the scope of the disclosure. In addition, many modifications may be made to adapt a particular situation or material to the teachings of the disclosure without departing from the essential scope thereof. Since certain changes may be made in the above compositions and methods without departing from the scope of the disclosure herein described, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein should be defined according to Webster's New Twentieth Century Dictionary Unabridged, Second Edition. The disclosures of all of the citations provided are being expressly incorporated herein by reference. The disclosed apparatus advances the state of the art and its many advantages include those described and claimed.

I claim:

1. An automated gang drill apparatus comprising:
   a plurality of drills mounted on a gang drill bed;
   a gang drill chassis for relocating the gang drill bed to one or more workstations, wherein the gang drill bed is secured to the gang drill chassis;
   a mobile remote operating panel usable by a gang drill operator remotely from the gang drill chassis; and
   a steering system comprising a steering interlock arm, a steering interlock body, a steering control linkage, and at least two pivotable wheels, wherein the steering interlock arm is positionable so as to impede the motion of the steering interlock body, whereby the at least two pivotable wheels steer in a normal steer mode, and wherein the steering interlock arm is positionable so as to impede the motion of the steering control linkage, whereby the at least two pivotable wheels steer in a crab steer mode;
   whereby the operator may be positioned in multiple positions for observing, viewing, and controlling the apparatus at a workstation.

2. The automated gang drill apparatus of claim 1 wherein the control panel is provided as a radio frequency wireless remote operating panel.

3. The apparatus of claim 2 wherein the automated gang drill apparatus is mounted on the boom of a backhoe or the hitch of a tractor.

4. The apparatus of claim 2 wherein the automated gang drill apparatus is configured to travel across a bridge parapet.

5. The apparatus of claim 2 wherein the automated gang drill apparatus can be activated to automatically disengage from a first drilling position and then align itself into a second drilling position relative to the first drilling position.

6. The automated gang drill apparatus of claim 1 herein the plurality of drills are pneumatically powered.

7. The automated gang drill apparatus of claim 1 wherein the plurality of drills are hydraulically powered.

8. The automated gang drill apparatus of claim 1 wherein the gang drill chassis is pneumatically powered.

9. The automated gang drill apparatus of claim 1 wherein the gang drill chassis is hydraulically powered.

10. The automated gang drill apparatus of claim 1 wherein the gang drill chassis is powered by an internal combustion engine.

11. The apparatus of claim 1 whereby the improved steering system further comprises an acuator to position the positionable steering interlock arm to two or more positions by actuating the steering control linkage.

12. The apparatus of claim 1 wherein a seat is provided for the operator when the apparatus is moving into position.

13. The apparatus of claim 1 wherein the control panel is provided as a radio frequency wireless remote operating panel and the plurality of drills is comprised of three or more drill heads and the drills are pneumatically powered.

* * * * *